United States Patent
Jo

(10) Patent No.: US 12,197,352 B2
(45) Date of Patent: Jan. 14, 2025

(54) OPERATING METHOD OF AN ELECTRONIC DEVICE

(71) Applicant: SAMSUNG ELECTRONICS CO., LTD., Suwon-si (KR)

(72) Inventor: Insoon Jo, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/867,754

(22) Filed: Jul. 19, 2022

(65) Prior Publication Data

US 2023/0169022 A1 Jun. 1, 2023

(30) Foreign Application Priority Data

Dec. 1, 2021 (KR) ........................ 10-2021-0170435

(51) Int. Cl.
*G06F 13/16* (2006.01)
*G06F 9/50* (2006.01)

(52) U.S. Cl.
CPC ........ *G06F 13/1668* (2013.01); *G06F 9/5016* (2013.01); *G06F 13/1621* (2013.01)

(58) Field of Classification Search
CPC . G06F 9/5016; G06F 13/1621; G06F 13/1668
USPC .............................. 710/14, 74; 711/141, 154
See application file for complete search history.

(56) References Cited

U.S. PATENT DOCUMENTS

| | | | |
|---|---|---|---|
| 10,606,785 | B2 | 3/2020 | Das Sharma et al. |
| 10,970,238 | B2 | 4/2021 | Sankaran et al. |
| 11,030,126 | B2 | 6/2021 | Koufaty et al. |
| 11,036,650 | B2 | 6/2021 | Agarwal |
| 11,442,858 | B1* | 9/2022 | Walker ................ G06F 12/0868 |
| 2019/0042455 | A1 | 2/2019 | Agarwal et al. |
| 2019/0102292 | A1 | 4/2019 | Agarwal et al. |
| 2019/0102311 | A1* | 4/2019 | Gupta ................. G06F 12/0897 |
| 2020/0379664 | A1 | 12/2020 | Mittal et al. |
| 2021/0011864 | A1* | 1/2021 | Guim Bernat ...... G06F 12/0833 |
| 2023/0052808 | A1* | 2/2023 | Puranik ................. G06F 12/084 |

* cited by examiner

*Primary Examiner* — Ilwoo Park
(74) *Attorney, Agent, or Firm* — F. CHAU & ASSOCIATES, LLC

(57) ABSTRACT

An operating method of an electronic device which includes a processor and a memory, the method including: accessing, using the processor, the memory without control of an external host device in a first bias mode; sending, from the processor, information of the memory to the external host device when the first bias mode ends; and accessing, using the processor, the memory under control of the external host device in a second bias mode.

15 Claims, 9 Drawing Sheets

OPERATING METHOD OF AN ELECTRONIC DEVICE

CROSS-REFERENCE TO RELATED APPLICATION

This application claims priority under 35 U.S.C. § 119 to Korean Patent Application No. 10-2021-0170435 filed on Dec. 1, 2021, in the Korean Intellectual Property Office, the disclosure of which is incorporated by reference herein in its entirety.

TECHNICAL FIELD

Embodiments of the present disclosure relate to an electronic device, and more particularly, to an electronic device supporting an independent operation together with providing a cache coherency.

DISCUSSION OF RELATED ART

Cache coherency is the uniformity of shared resource data that ends up stored in multiple local caches. Cache coherency is a concern when a first electronic device and a second electronic device share specific data. For example, when the first electronic device and the second electronic device support the cache coherency, specific data stored in the second electronic device are also modified when the first electronic device modifies the specific data.

The cache coherency may be required when a plurality of processors (or processor cores) process data in a state where the data are shared by the processors. Since electronic devices using multiple cores are widely used, research on bow to support the cache coherency continues.

SUMMARY

Embodiments of the present disclosure provide an operating method of an electronic device capable of partially blocking cache coherency such that an independent operation is possible, together with supporting the cache coherency.

According to an embodiment of the present disclosure, there is provided an operating method of an electronic device which includes a processor and a memory, the method including: accessing, using the processor, the memory without control of an external host device in a first bias mode; sending, from the processor, information of the memory to the external host device when the first bias mode ends; and accessing, using the processor, the memory under control of the external host device in a second bias mode.

According to an embodiment of the present disclosure, there is provided an operating method of an electronic device which includes a processor and a memory, the method including: not intervening, with the processor, in an access of an external electronic device to a memory of the external electronic device, in a first bias mode; receiving, at the processor, information of the memory of the external electronic device from the external electronic device when the first bias mode ends; and controlling, using the processor, the access of the external electronic device to the memory of the external electronic device, in a second bias mode.

According to an embodiment of the present disclosure, there is provided an operating method of an electronic device which includes a host device and an accelerator, the method including: maintaining, using the host device, a coherency of a memory of the accelerator and a memory of the host device while the accelerator does not perform an operation; blocking, using the host device, the coherency of the memory of the accelerator and the memory of the host device while the accelerator performs an operation; and recovering, using the host device, the coherency of the memory of the accelerator and the memory of the host device after the accelerator completes the operation.

BRIEF DESCRIPTION OF THE FIGURES

The above and other features of the present disclosure will become apparent by describing in detail embodiments thereof with reference to the accompanying drawings.

DETAILED DESCRIPTION OF THE EMBODIMENTS

Figure 1:
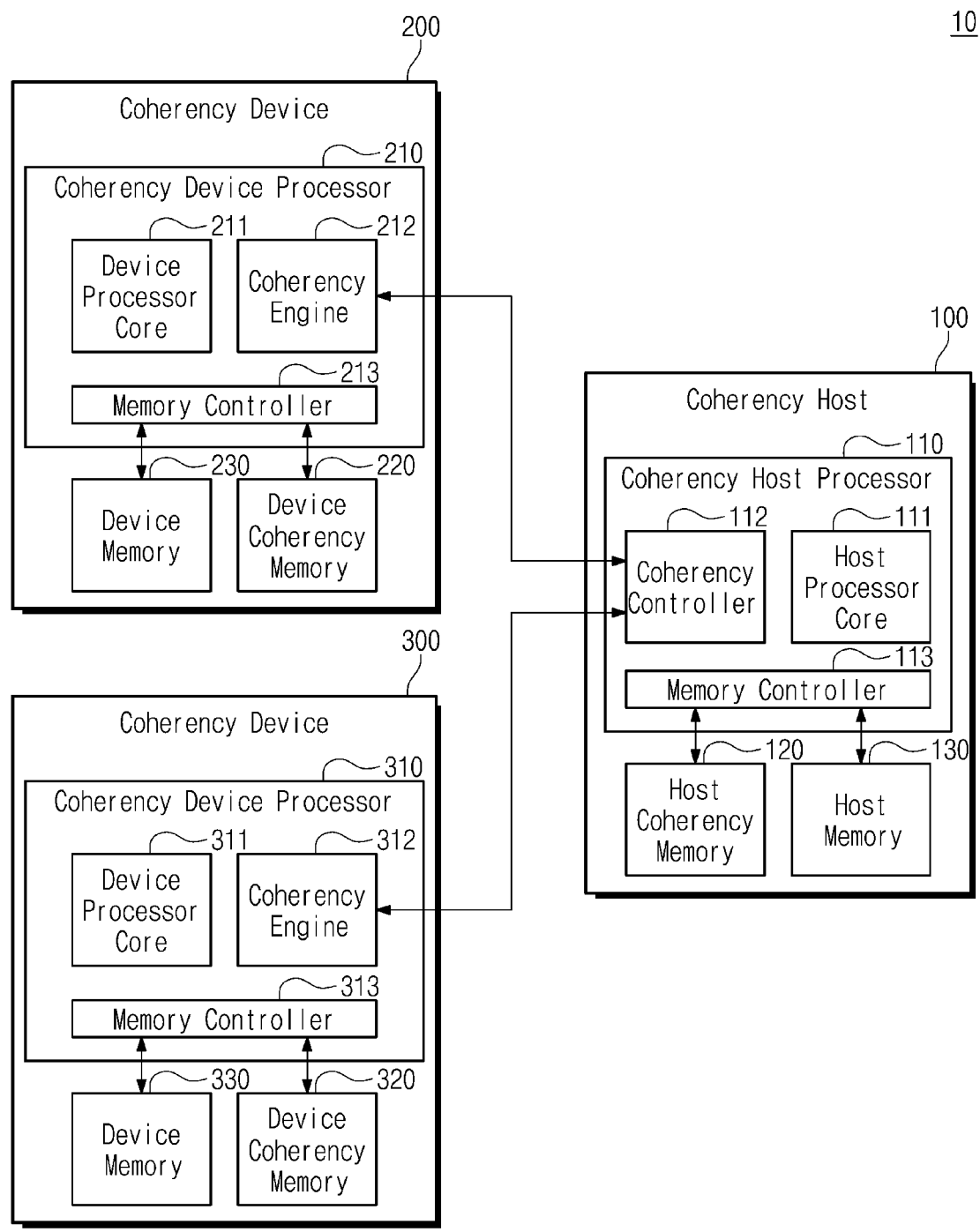
FIG. 1 illustrates an electronic device according to an embodiment of the present disclosure.

FIG. 1 illustrates an electronic device 10 according to an embodiment of the present disclosure. Referring to FIG. 1, the electronic device 10 may include a coherency host 100, a first coherency device 200, and a second coherency device 300.

In an embodiment of the present disclosure, the coherency host 100 may be implemented with a central processing unit (CPU) (or a central processing unit core) or an application processor (AP) (or an application processor core). Each of the first coherency device 200 and the second coherency device 300 may be implemented with a graphic processing unit (or graphic processing core), a neural processor (or neural processor core), a neuromorphic processor (or neuromorphic processor core), a digital signal processor (or digital signal processor core), an image signal processor (or image signal processor core), etc.

In an embodiment of the present disclosure, the coherency host 100 may be implemented as a host device that controls the first coherency device 200 and the second coherency device 300. Each of the first coherency device 200 and the second coherency device 300 may be implemented with an accelerator that supports an operation of the coherency host 100.

The coherency host 100, the first coherency device 200, and the second coherency device 300 may be implemented with one semiconductor device or may be implemented with two or more independent semiconductor devices. The coherency host 100, the first coherency device 200, and the second coherency device 300 may be components of the electronic device 10; however, each of the coherency host 100, the first coherency device 200, and the second coherency device 300 may be referred to as an "electronic device".

The coherency host 100, the first coherency device 200, and the second coherency device 300 may support the cache coherency. Each of the coherency host 100, the first coherency device 200, and the second coherency device 300 may include a memory that is used as a cache memory. In the case where the cache coherency is supported, when data of a cache memory included in one of the coherency host 100, the first coherency device 200, and the second coherency device 300 are updated, the same update may be performed on the remaining cache memories (under the condition that the same data are stored in the remaining cache memories).

The coherency host 100 may include a coherency host processor 110, a host coherency memory 120, and a host memory 130. The coherency host processor 110 may support the cache coherency by using the host coherency memory 120 and may use the host memory 130 as a local memory.

The coherency host processor 110 may include a host processor core 111, a coherency controller 112, and a memory controller 113. The host processor core 111 may execute an operating system of the electronic device 10. The host processor core 111 may allocate or request a task to or from the first coherency device 200 and/or the second coherency device 300.

An embodiment in which the electronic device 10 includes the coherency host 100, the first coherency device 200, and the second coherency device 300 is described, but the electronic device 10 may further include additional other components. For example, the electronic device 10 may include a third coherency device. The host processor core 111 may control the additional other components.

The coherency controller 112 may perform an operation associated with the cache coherency. The coherency controller 112 may support two or more modes associated with the cache coherency. The two or more modes may include a mode in which the cache coherency is partially supported, a mode in which the cache coherency is supported (e.g., fully supported), and a mode in which the cache coherency is not supported.

In the mode in which the cache coherency is partially supported, the coherency controller 112 may partially control accesses to memories associated with the coherency from among all memories associated with the cache coherency, for example, from among memories of the coherency host 100, the first coherency device 200, and/or the second coherency device 300.

In the mode in which the cache coherency is supported, the coherency controller 112 may control accesses to the memories associated with the coherency from among all the memories associated with the cache coherency, for example, from among the memories of the coherency host 100, the first coherency device 200, and/or the second coherency device 300.

The coherency controller 112 may control a switch between the two or more modes. The coherency controller 112 may perform a mode control in a 1:1 manner with each of the first coherency device 200 and the second coherency device 300.

The coherency controller 112 may access the host coherency memory 120 through the memory controller 113 in response to a request of the host processor core 111. When the cache coherency with the first coherency device 200 and/or the second coherency device 300 is supported and data of the host coherency memory 120 are modified, the coherency controller 112 may request the first coherency device 200 and/or the second coherency device 300 to perform the same modification on the same data stored in a cache coherency-related memory of the first coherency device 200 and/or the second coherency device 300 (immediately or after a specific time passes). For example, the coherency controller 112 may request the first coherency device 200 and/or the second coherency device 300 to perform the same modification on the same data stored in a device coherency memory 220 of the first coherency device 200 and/or a device coherency memory 320 of the second coherency device 300.

When the cache coherency with the first coherency device 200 and/or the second coherency device 300 is supported and specific data of a cache coherency-related memory of the first coherency device 200 are modified, the coherency controller 112 may request the memory controller 113 or the second coherency device 300 to perform the same modification on the same data stored in a cache coherency-related memory of the host coherency memory 120 and/or the second coherency device 300 (immediately or after a specific time passes). For example, the same modification may be performed on the same data stored in the device coherency memory 320 of the second coherency device 300.

Likewise, when the cache coherency with the first coherency device 200 and/or the second coherency device 300 is supported and specific data of a cache coherency-related memory of the second coherency device 300 are modified, the coherency controller 112 may request the memory controller 113 or the first coherency device 200 to perform the same modification on the same data stored in a cache coherency-related memory of the host coherency memory 120 and/or the first coherency device 200 (immediately or after a specific time passes). For example, the same modification may be performed on the same data stored in the device coherency memory 220 of the first coherency device 200.

The memory controller 113 may access the host coherency memory 120 and the host memory 130. For example, the memory controller 113 may access the host coherency memory 120 depending on a request of the coherency controller 112 and may access the host memory 130 depending on a request of the host processor core 111.

In an embodiment of the present disclosure, the memory controller 113 may include a first controller for the host coherency memory 120 and a second controller for the host memory 130.

The first coherency device 200 may include a coherency device processor 210, the device coherency memory 220, and a device memory 230. The coherency device processor 210 may support the cache coherency by using the device coherency memory 220 and may use the device memory 230 as a local memory.

The coherency device processor 210 may include a device processor core 211, a coherency engine 212, and a memory controller 213. The device processor core 211 may execute firmware of the first coherency device 200 or codes loaded by the coherency host 100. The device processor core 211 may perform a task allocated or requested by the coherency host 100 by using the device coherency memory 220 or the device memory 230.

For example, the device processor core 211 may process data (e.g., shared data) stored in the device coherency memory 220. The device processor core 211 may use the device coherency memory 220 and/or the device memory 230 as a working memory for data processing. The device processor core 211 may update at least a portion of data of the device coherency memory 220 based on a processing result.

The coherency engine 212 may perform an operation associated with the cache coherency. The coherency engine 212 may support two or more modes associated with the cache coherency. The two or more modes may include a mode in which the cache coherency is partially supported, a mode in which the cache coherency is supported (e.g., fully supported), and a mode in which the cache coherency is not supported.

In the mode in which the cache coherency is partially supported, the coherency engine 212 may partially perform an access to a cache coherency-related memory, for example, the device coherency memory 220 under control of the coherency controller 112. In the mode in which the cache coherency is supported, the coherency engine 212 may perform an access to the device coherency memory 220 under control of the coherency controller 112. The coherency engine 212 may perform a switch between the two or more modes under control of the coherency controller 112.

The coherency engine 212 may access the device coherency memory 220 through the memory controller 213 in response to a request of the coherency controller 112 and/or the device processor core 211. When the cache coherency with the coherency host 100 is supported and data of the device coherency memory 220 are modified by the device processor core 211, the coherency engine 212 may provide modification information (e.g., an address or a tag) and/or modified data to the coherency controller 112 (e.g., depending on a request of the coherency controller 112 or automatically in response to the modification being made).

The memory controller 213 may access the device coherency memory 220 and the device memory 230. For example, the memory controller 213 may access the device coherency memory 220 depending on a request of the coherency engine 212 and may access the device memory 230 depending on a request of the device processor core 211. In an embodiment of the present disclosure, the memory controller 213 may include a first controller for the device coherency memory 220 and a second controller for the device memory 230.

The second coherency device 300 may include a coherency device processor 310, the device coherency memory 320, and a device memory 330. The coherency device processor 310 may include a device processor core 311, a coherency engine 312, and a memory controller 313.

Configurations, features, and functions of the coherency device processor 310, the device coherency memory 320, the device memory 330, the device processor core 311, the coherency engine 312, and the memory controller 313 may respectively correspond to the configurations, features, and functions of the coherency device processor 210, the device coherency memory 220, the device memory 230, the device processor core 211, the coherency engine 212, and the memory controller 213. For example, the memory controller 313 may access the device coherency memory 320 depending on a request of the coherency engine 312 and may access the device memory 330 depending on a request of the device processor core 311. Thus, additional description will be omitted to avoid redundancy.

In the embodiment of FIG. 1, the cache coherency-related memories may include the host coherency memory 120, the device coherency memory 220, and the device coherency memory 320. In an embodiment of the present disclosure, the communication for cache coherency between the host coherency memory 120, the device coherency memory 220, and the device coherency memory 320 may be based on the Compute Express Link™ (CXL™).

Figure 2:
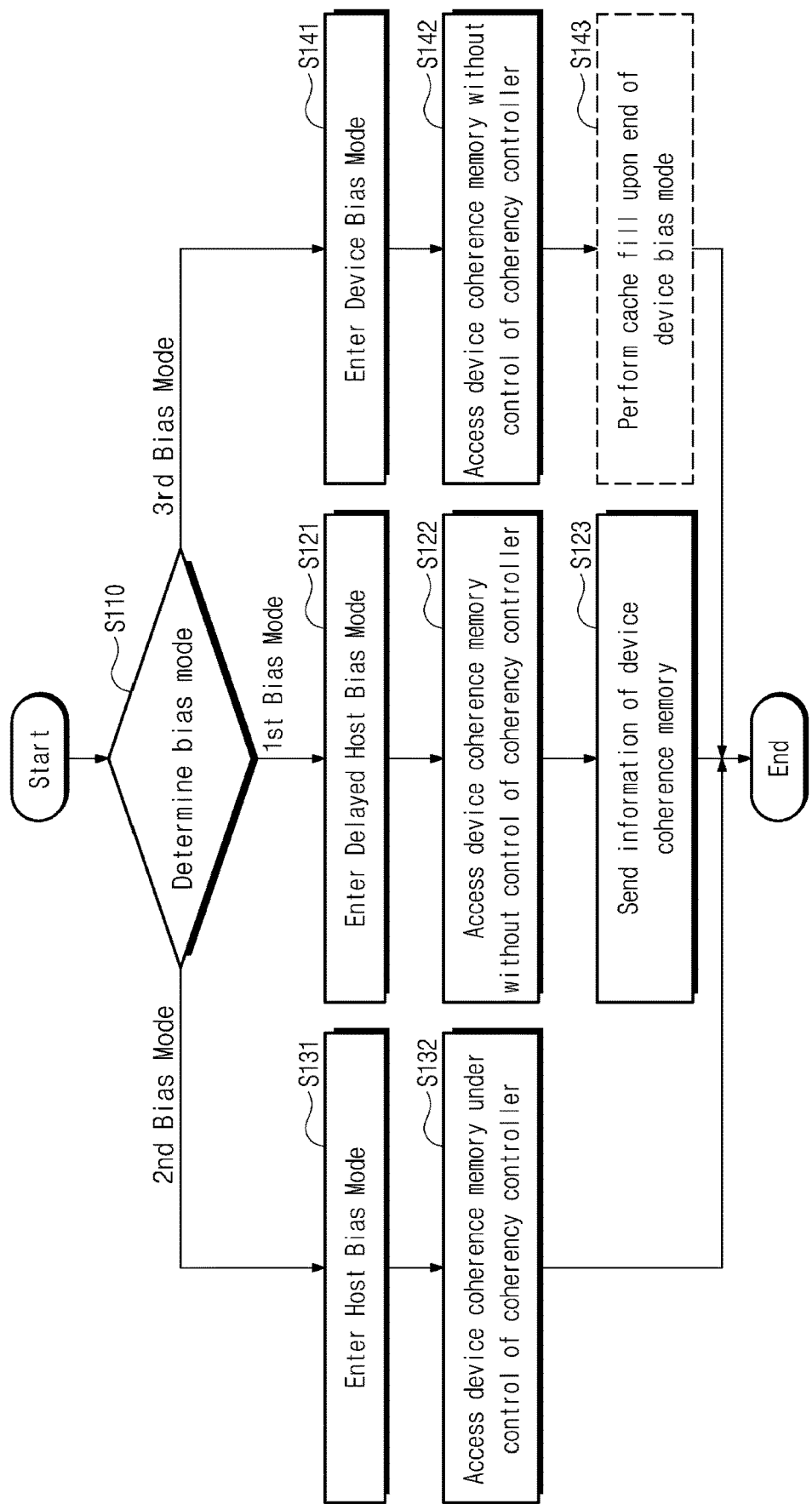
FIG. 2 illustrates an example of an operating method of an electronic device according to an embodiment of the present disclosure.

FIG. 2 illustrates an example of an operating method of the electronic device 10 according to an embodiment of the present disclosure. For brevity of description, an example of an operation between the coherency host 100 and the first coherency device 200 will be described with reference to FIGS. 1 and 2. However, the same operation may be performed between the coherency host 100 and the second coherency device 300.

Referring to FIGS. 1 and 2, in operation S110, the electronic device 10 may determine a bias mode. For example, the coherency host 100 may determine the bias mode. As another example, the coherency host 100 may determine the bias mode depending on a request of the first coherency device 200. As another example, the first coherency device 200 may determine the bias mode and may request the determined mode from the coherency host 100. As yet another example, the coherency host 100 may determine the bias mode depending on a request of the second coherency device 300.

When a first bias mode is determined, operation S121 to operation S123 may be performed. For example, the first bias mode may be a delayed host bias mode. In operation S121, the coherency host 100 and the first coherency device 200 may enter the delayed host bias mode.

The delayed host bias mode may partially support the cache coherency. While the first coherency device 200 operates in the delayed host bias mode together with the coherency host 100, the coherency host 100 may ignore the cache coherency with the first coherency device 200 and may not intervene in the access of the first coherency device 200 to the device coherency memory 220. The first coherency device 200 may access the device coherency memory 220 without the intervention of the coherency controller 112. In other words, the first coherency device 200 may access the device coherency memory 220 independent of the coherency controller 112.

The first coherency device 200 may access the device coherency memory 220 without the intervention or control of the coherency controller 112. Accordingly, a speed at which the first coherency device 200 accesses the device coherency memory 220 may be improved compared to the case when the device coherency memory 220 is accessed through the coherency controller 112.

The first coherency device 200 may ignore the cache coherency until a wanted point in time, for example, until a task allocated or requested by the coherency host 100 is completely processed. Accordingly, the atomicity and isolation may be secured in the operation of the first coherency device 200.

While the delayed host bias mode is maintained, in operation S122, the first coherency device 200 may access the device coherency memory 220 quickly (e.g., without the control of the coherency controller 112) and safely (e.g., with the atomicity and isolation maintained).

When the delayed host bias mode ends (e.g., when entering a host bias mode), the coherency host 100 and the first coherency device 200 may recover the cache coherency. For example, in operation S123, the first coherency device 200 may provide the coherency host 100 with information (e.g., an address or a tag) about modified data of data of the device coherency memory 220 and/or the modified data. The coherency host 100 may recover the cache coherency based on the received information and/or the received data.

When a second bias mode is determined in operation S110, operation S131 and operation S132 may be performed. For example, the second bias mode may be a host bias mode of the CXL™. In operation S131, the coherency host 100 and the first coherency device 200 may enter the host bias mode.

While the host bias mode is maintained, in operation S132, the first coherency device 200 may access the device coherency memory 220 under the control of the coherency controller 112. Because the cache coherency is maintained in the host bias mode, an additional operation (e.g., the above coherency recovery) associated with the cache coherency is not required when the host bias mode ends.

When a third bias mode is determined in operation S110, operation S141 to operation S143 may be performed. For example, the third bias mode may be a device bias mode of the CXL™. In operation S141, the coherency host 100 and the first coherency device 200 may enter the device bias mode.

While the device bias mode is maintained, in operation S142, the coherency host 100 may not require the first coherency device 200 to maintain the cache coherency. The coherency host 100 may release a storage space (e.g., a cache memory space) in the host coherency memory 120 allocated for the first coherency device 200. The first coherency device 200 may access the device coherency memory 220 without the control of the coherency controller 112.

A process in which the coherency host 100 and the first coherency device 200 terminate the device bias mode may be selectively performed. For example, when the recovery of the cache coherency is required, operation S143 may be performed. In operation S143, the coherency host 100 may allocate a storage space (e.g., a cache memory space) for the first coherency device 200 to the host coherency memory 120. The coherency host 100 may perform a cache fill operation in which data of the device coherency memory 220 of the first coherency device 200 are filled in the allocated storage space. As another example, when the recovery of the cache coherency is not required, operation S143 may not be performed.

Figure 3:
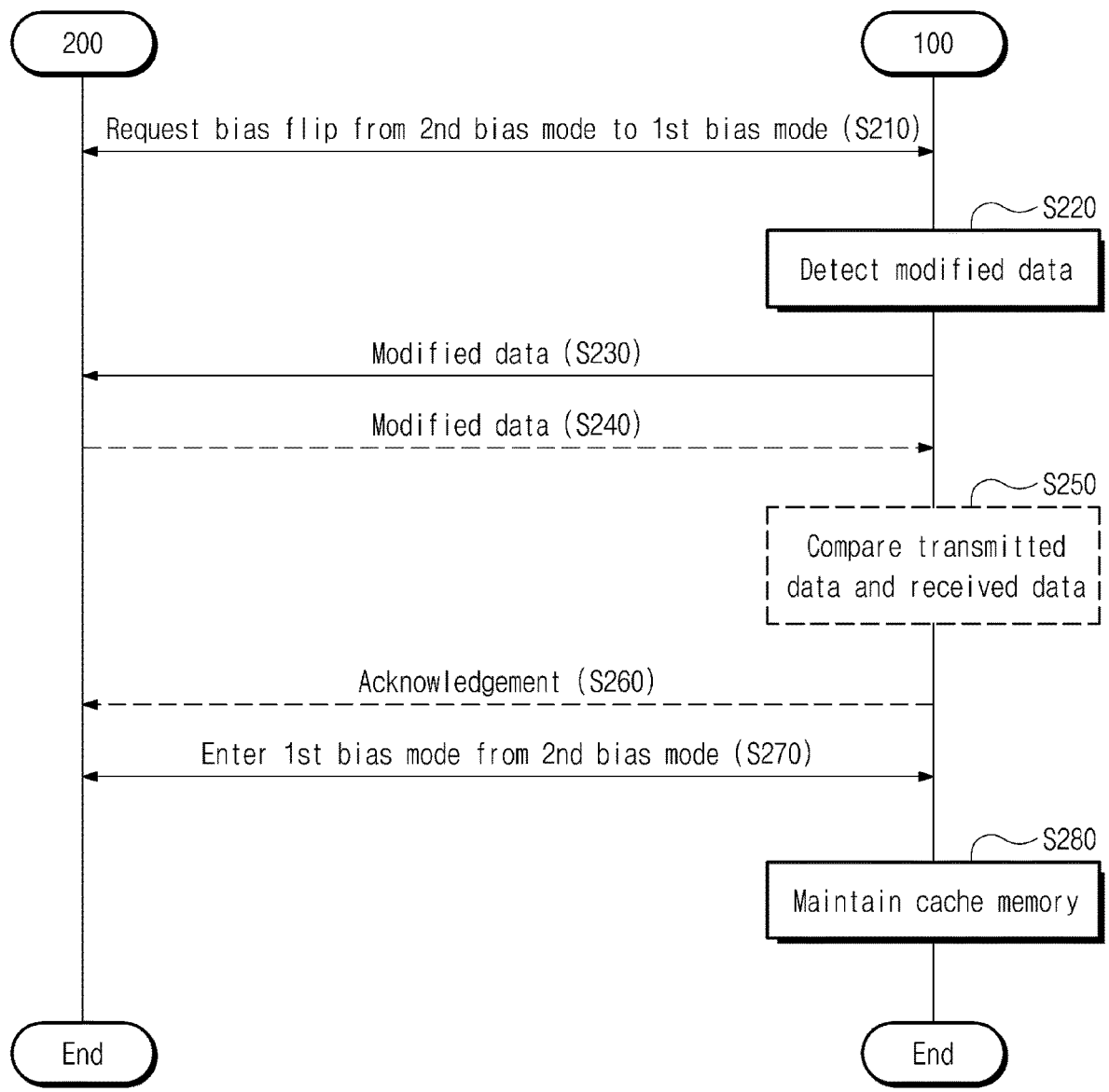
FIG. 3 illustrates an example of a process in which a coherency host and a first coherency device enter a first bias mode from a second bias mode according to an embodiment of the present disclosure.

FIG. 3 illustrates an example of a process in which the coherency host 100 and the first coherency device 200 enter the first bias mode from the second bias mode. For example, a process of switching a bias mode may be called a "bias flip".

Referring to FIGS. 1 and 3, in operation S210, the coherency host 100 may request the first coherency device 200 to perform the bias flip from the second bias mode to the first bias mode, or the first coherency device 200 may request the coherency host 100 to perform the bias flip from the second bias mode to the first bias mode.

In operation S220, the coherency host 100 may detect first modified data. For example, the coherency host 100 may detect, as the first modified data, data that are modified (or updated) only in the host coherency memory 120 after being stored in common in the host coherency memory 120 and the device coherency memory 220 of the first coherency device 200.

For example, the host coherency memory 120 may be used as a cache memory including a plurality of cache lines, and the detection of the first modified data may be performed units of at least one cache line. In operation S230, the coherency host 100 may send the first modified data corresponding to at least one cache line to the first coherency device 200.

The first modified data may be sent together with information (e.g., an address or a tag) of the first modified data. The first coherency device 200 may update the device coherency memory 220 by using the information of the first modified data and the first modified data. For example, the first coherency device 200 may update (or replace) data of the device coherency memory 220, which correspond to the information about the first modified data, with the first modified data.

When additional data necessary for the first coherency device 200 (e.g., data necessary for processing) are present in addition to the first modified data, the coherency host 100 may send the additional data and information (e.g., an address or a tag) of the additional data, as a portion of the first modified data and the information of the first modified data or together with the first modified data and the information of the first modified data. The first coherency device 200 may store the additional data and the information of the additional data in the device coherency memory 220.

The transmitted data may be checked in operation S240 to operation S260. For example, in operation S240, the first coherency device 200 may again send, to the coherency host 100, the first modified data and/or the information of the first modified data received from the coherency host 100.

In operation S250, the coherency host 100 may compare the transmitted data and/or the information of the transmitted data provided to the first coherency device 200 with the received data and/or the information of the received data provided from the first coherency device 200. When a comparison result indicates "matched", in operation S260, the coherency host 100 may send an acknowledgement message to the first coherency device 200. When the comparison result indicates "mismatched", operation S230 to operation S260 may again be performed.

After the acknowledgement message is sent from the coherency host 100 to the first coherency device 200 in operation S260, in operation S270, the coherency host 100 and the first coherency device 200 may enter the first bias mode from the second bias mode. After the coherency host 100 and the first coherency device 200 enter the first bias mode, in operation S280, the coherency host 100 may maintain a storage space (e.g., a cache memory space) in the host coherency memory 120 allocated for the first coherency device 200 without release.

In an embodiment of the present disclosure, operation S240 to operation S260 marked by a dotted line may be selectively performed. In the case where operation S240 to operation S260 are omitted, after the first modified data are sent from the coherency host 100 to the first coherency device 200, the coherency host 100 and the first coherency device 200 may enter the first bias mode from the second bias mode.

Figure 4:
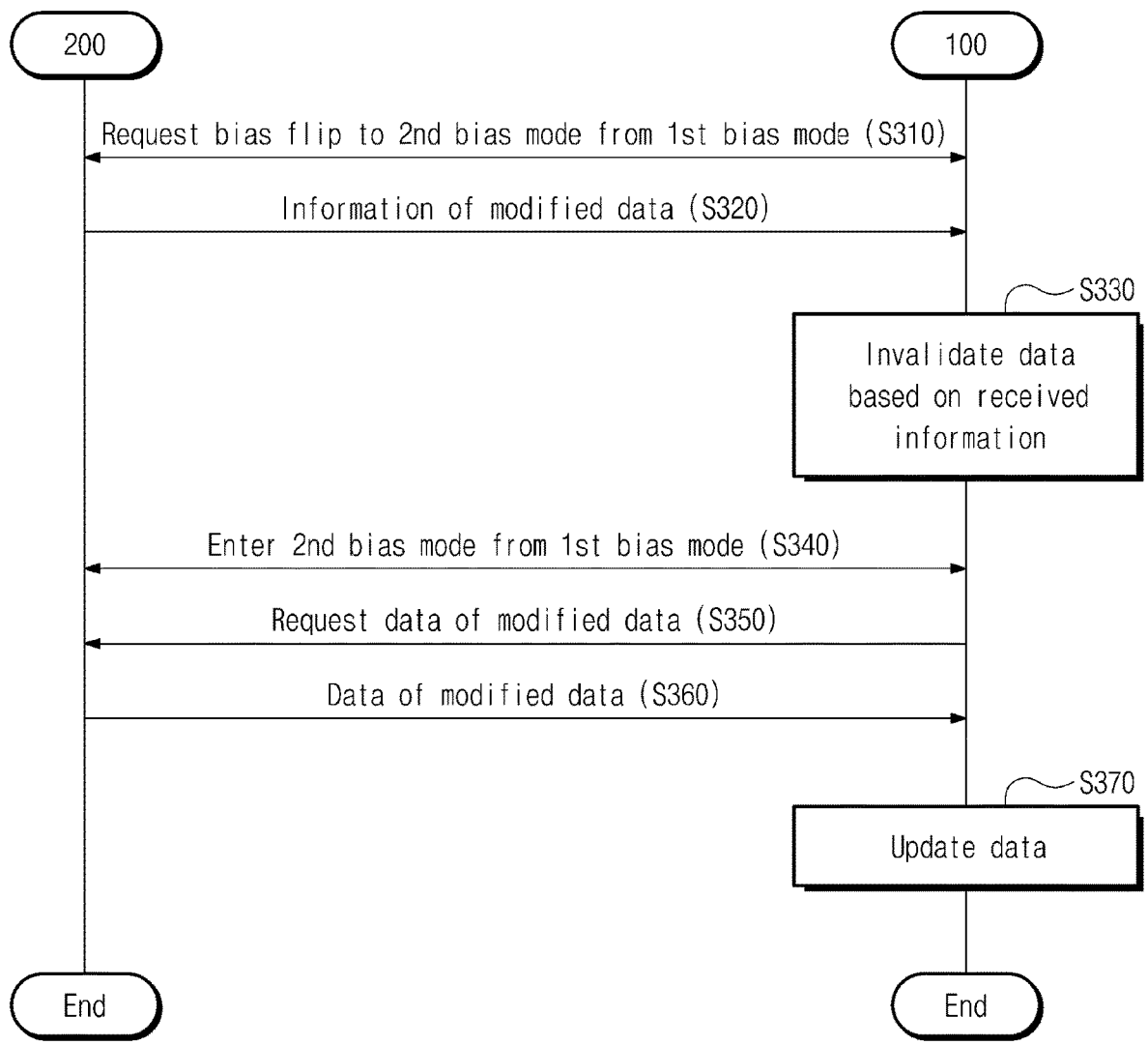
FIG. 4 illustrates an example of a process in which a coherency host and a first coherency device enter a second bias mode from a first bias mode according to an embodiment of the present disclosure.

FIG. 4 illustrates an example of a process in which the coherency host 100 and the first coherency device 200 enter the second bias mode from the first bias mode. For example, a process of switching a bias mode may be called a "bias flip".

Referring to FIGS. 1 and 4, in operation S310, the coherency host 100 may request the first coherency device 200 to perform the bias flip from the first bias mode to the second bias mode, or the first coherency device 200 may request the coherency host 100 to perform the bias flip from the first bias mode to the second bias mode. In other words, either the coherency host 100 or the first coherency device 200 may initiate the bias flip request.

In operation S320, the first coherency device 200 may send information (e.g., an address or a tag) of modified data to the coherency host 100. For example, the first coherency device 200 may send information of data (e.g., second modified data), which are modified (or updated) after entering the first bias mode, from among data stored in the device coherency memory 220 to the coherency host 100.

In operation S330, based on the received information, the coherency host 100 may invalidate data, which correspond to the second modified data modified (or updated) by the first coherency device 200 during the first bias mode, from among the data stored in the host coherency memory 120. The invalidation of data may be performed in units of at least one cache line. The invalidated cache line may be released from allocation. In other words, the data of the invalidated cache line may be deleted.

In an embodiment of the present disclosure, after the second modified data are provided from the first coherency device 200 to the coherency host 100, as in the above description given with reference to operation S240 to operation S260 of FIG. 3, the process of checking whether the second modified data are correctly transmitted may be selectively performed.

In operation S340, the coherency host 100 and the first coherency device 200 may enter the second bias mode from the first bias mode. Afterwards, the second modified data may be requested by the coherency host 100. For example, the host processor core 111 of the coherency host 100 or the second coherency device 300 may require the second modified data.

Because data corresponding to the second modified data are absent from the host coherency memory 120 (due to the invalidation), a cache miss may occur. In operation S350, the coherency host 100 may request the second modified data from the first coherency device 200. In response to the request, in operation S360, the first coherency device 200 may provide the second modified data and/or the information of the second modified data to the coherency host 100.

In operation S370, the coherency host 100 may update the data of the host coherency memory 120 by storing the second modified data and/or the information of the second modified data in the host coherency memory 120.

As described above, when the recovery of the cache coherency is required, the coherency host 100 and the first coherency device 200 may be configured to recover the cache coherency based on invalidation of data corresponding to the second modified data and a cache miss.

Figure 5:
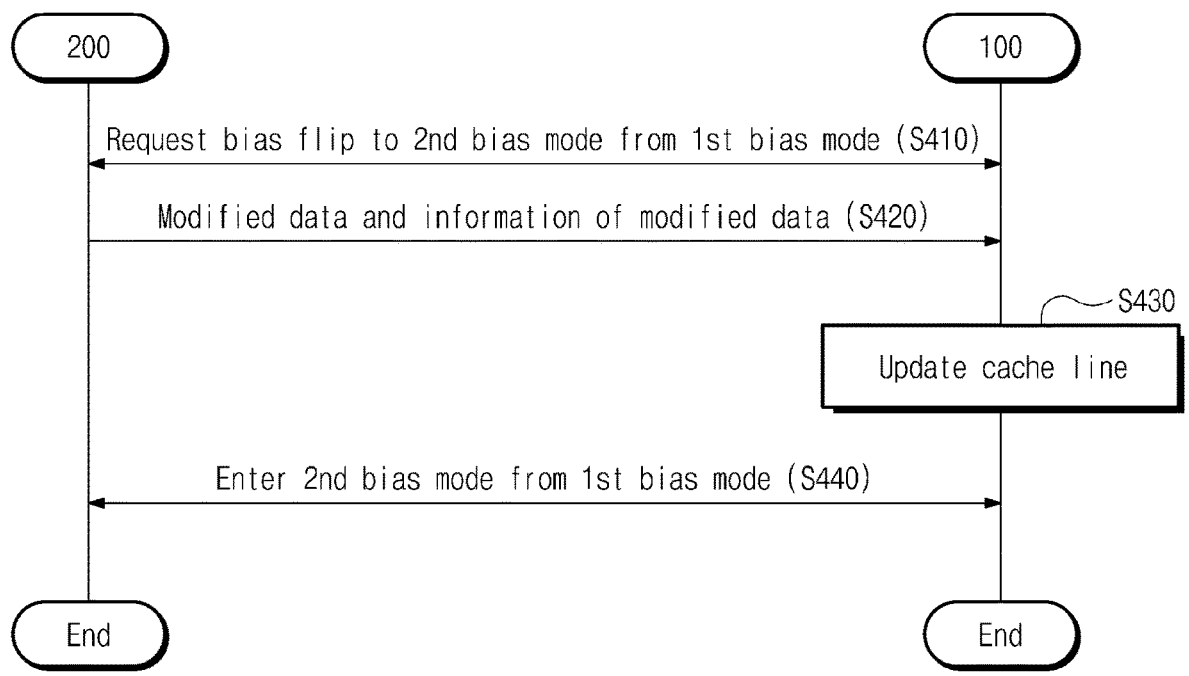
FIG. 5 illustrates another example of a process in which a coherency host and a first coherency device enter a second bias mode from a first bias mode according to an embodiment of the present disclosure.

FIG. 5 illustrates another example of a process in which the coherency host 100 and the first coherency device 200 enter the second bias mode from the first bias mode. For example, a process of switching a bias mode may be called a "bias flip".

Referring to FIGS. 1 and 5, in operation S410, the coherency host 100 may request the first coherency device 200 to perform the bias flip from the first bias mode to the second bias mode, or the first coherency device 200 may request the coherency host 100 to perform the bias flip from the first bias mode to the second bias mode.

In operation S420, the first coherency device 200 may send the second modified data and/or the information (e.g., an address or a tag) of the second modified data to the coherency host 100. For example, the first coherency device 200 may send, to the coherency host 100, the second modified data, which are modified (or updated) after entering the first bias mode, from among data stored in the device coherency memory 220 and information of the second modified data.

In operation S430, the coherency host 100 may update the data of the host coherency memory 120 by storing the second modified data and/or the information of the second modified data in the host coherency memory 120. In other words, the coherency host 100 may update a cache line in the host coherency memory 120. In an embodiment of the present disclosure, after the second modified data and/or the information of the second modified data are provided from the first coherency device 200 to the coherency host 100, as in the above description given with reference to operation S240 to operation S260 of FIG. 3, the process of checking whether the second modified data are correctly transmitted may be selectively performed.

In operation S440, the coherency host 100 and the first coherency device 200 may enter the second bias mode from the first bias mode. Compared to the operating method of FIG. 4, the first coherency device 200 sends the second modified data and/or the information of the second modified data to the coherency host 100 before entering the second bias mode. The coherency host 100 updates the data of the host coherency memory 120 by using the second modified data. In other words, after the cache coherency is completely recovered, the coherency host 100 and the first coherency device 200 may enter the second bias mode.

Figure 6:
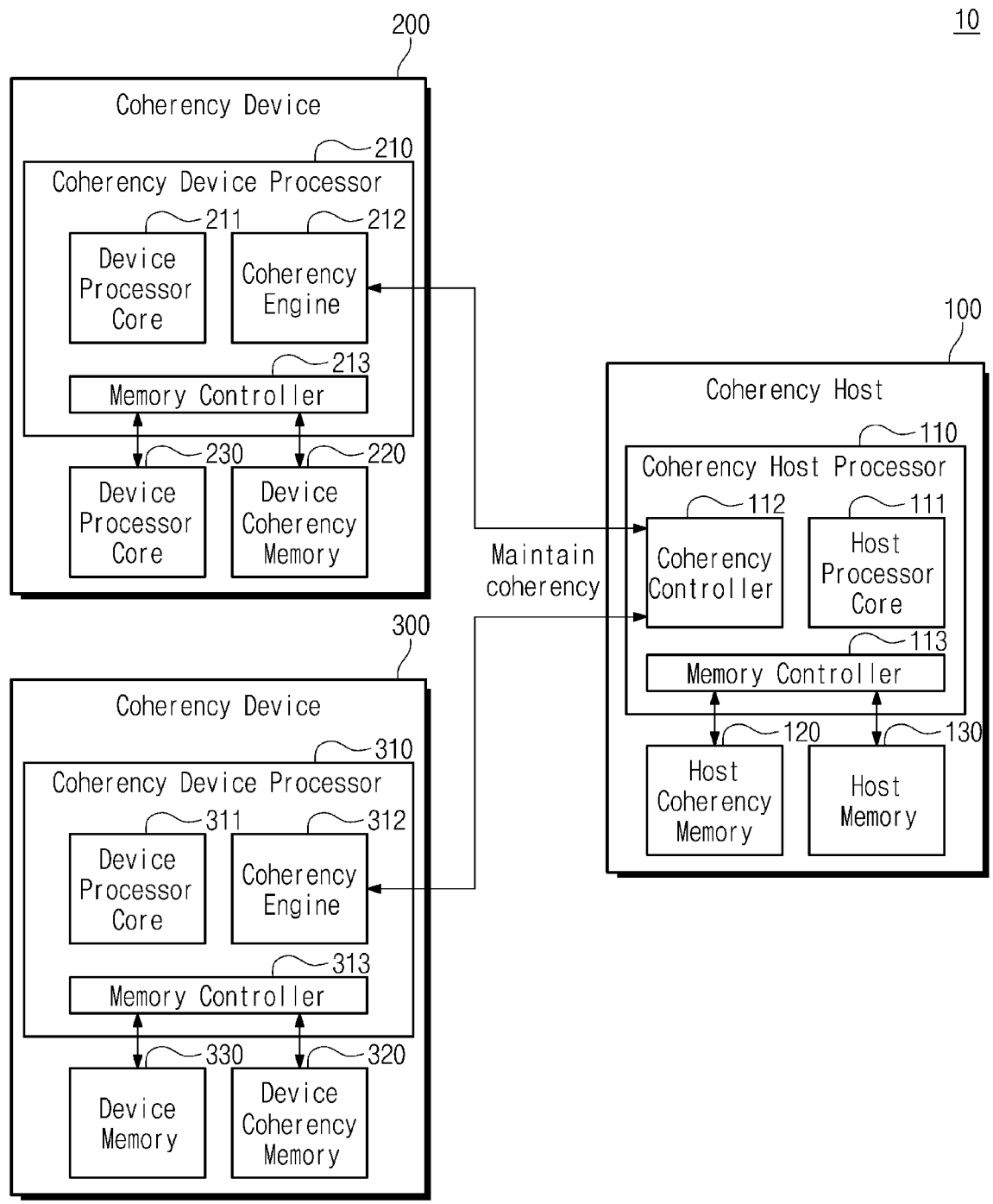
FIG. 6 illustrates an example corresponding to the case where an electronic device is in a second bias mode before entering a first bias mode according to an embodiment of the present disclosure.

FIG. 6 illustrates an example corresponding to the case where the electronic device 10 is in the second bias mode before entering the first bias mode. Referring to FIG. 6, the device coherency memory 220 of the first coherency device 200 may store input data for processing of the device processor core 211. The device coherency memory 320 of the second coherency device 300 may store input data for processing of the device processor core 311.

The cache coherency may be maintained between data of the device coherency memory 220 of the first coherency device 200, data of the device coherency memory 320 of the second coherency device 300, and the host coherency memory 120 of the coherency host 100. In other words, the input data of the device processor core 211 and the input data of the device processor core 311 may be prepared based on the cache coherency. Like that shown in FIG. 1, in FIG. 6, the coherency engine 212 may communicate directly with the coherency controller 112 and the coherency engine 312 may communicate directly with the coherency controller 112.

Figure 7:
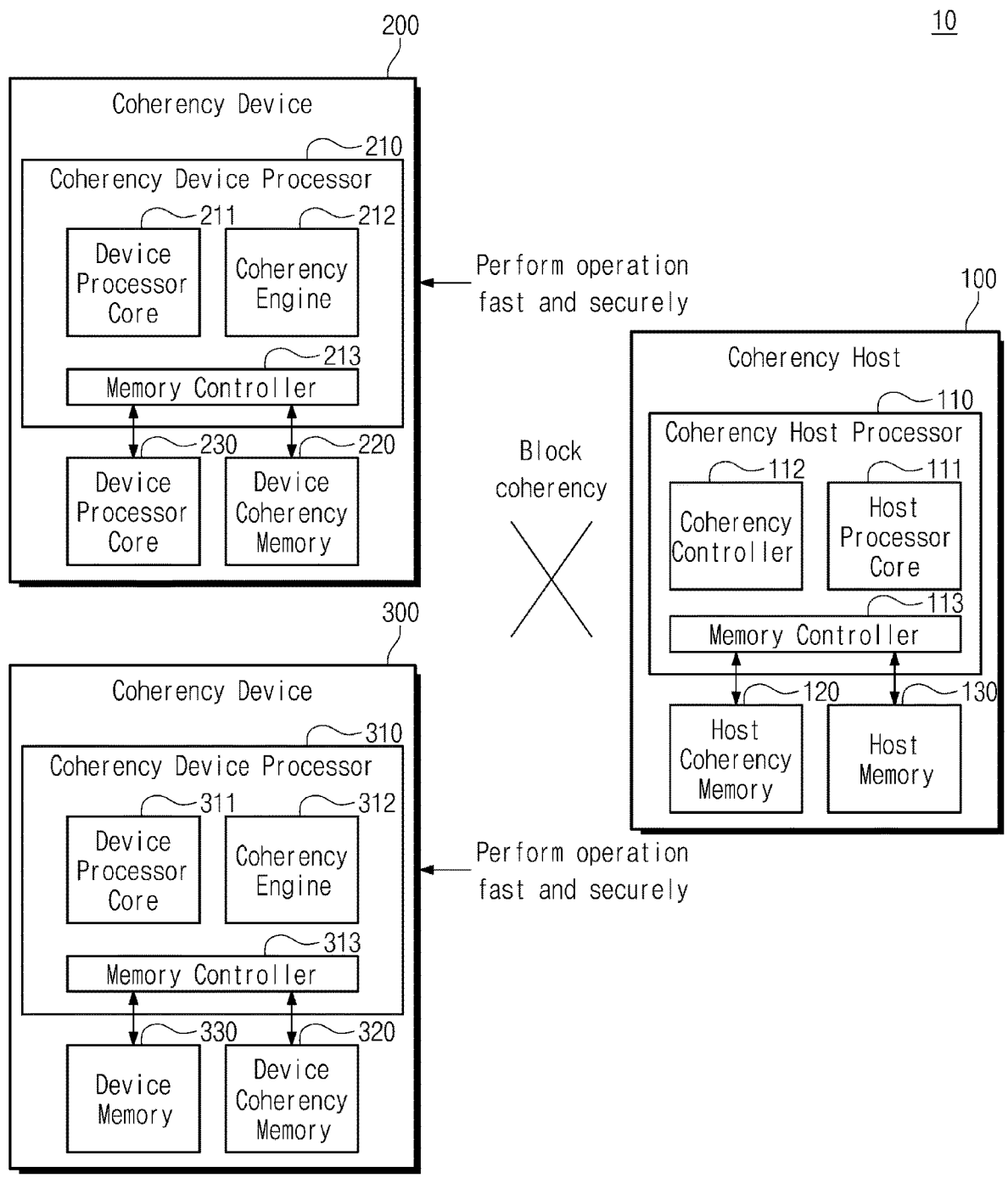
FIG. 7 illustrates an example corresponding to the case where an electronic device operates in a first bias mode according to an embodiment of the present disclosure.

FIG. 7 illustrates an example corresponding to the case where the electronic device 10 operates in the first bias mode. Referring to FIG. 7, the cache coherency may be blocked between data of the device coherency memory 220 of the first coherency device 200, data of the device coherency memory 320 of the second coherency device 300, and the host coherency memory 120 of the coherency host 100. For example, unlike that shown in FIG. 6, the coherency engine 212 may not be linked with the coherency controller 112 and the coherency engine 312 may not be linked with the coherency controller 112.

The device coherency memory 220 of the first coherency device 200 may store input data for processing of the device processor core 211. The device processor core 241 may perform processing based on the data stored in the device coherency memory 220 without the control of the coherency controller 112 through the coherency engine 212. Accordingly, the processing of the device processor core 211 may be performed quickly.

The device processor core 211 may store a processing result in the device coherency memory 220. Because the cache coherency (between the first coherency device 200 and the coherency host 100) is blocked, the processing operation of the device processor core 211 is not notified to the coherency host 100. Because the processing of the device processor core 211 is not exposed and the atomicity and isolation are secured, the device processor core 211 may safely access the device coherency memory 220.

The device coherency memory 320 of the second coherency device 300 may store input data for processing of the device processor core 311. The device processor core 311 may perform processing based on the data stored in the device coherency memory 320 without the control of the coherency controller 112 through the coherency engine 312. Accordingly, the processing of the device processor core 311 may be performed quickly.

The device processor core 311 may store a processing result in the device coherency memory 320. Because the cache coherency (between the second coherency device 300 and the coherency host 100) is blocked, the processing operation of the device processor core 311 is not notified to the coherency host 100. Because the processing of the device processor core 311 is not exposed and the atomicity and isolation are secured, the device processor core 311 may safely access the device coherency memory 320.

Figure 8:
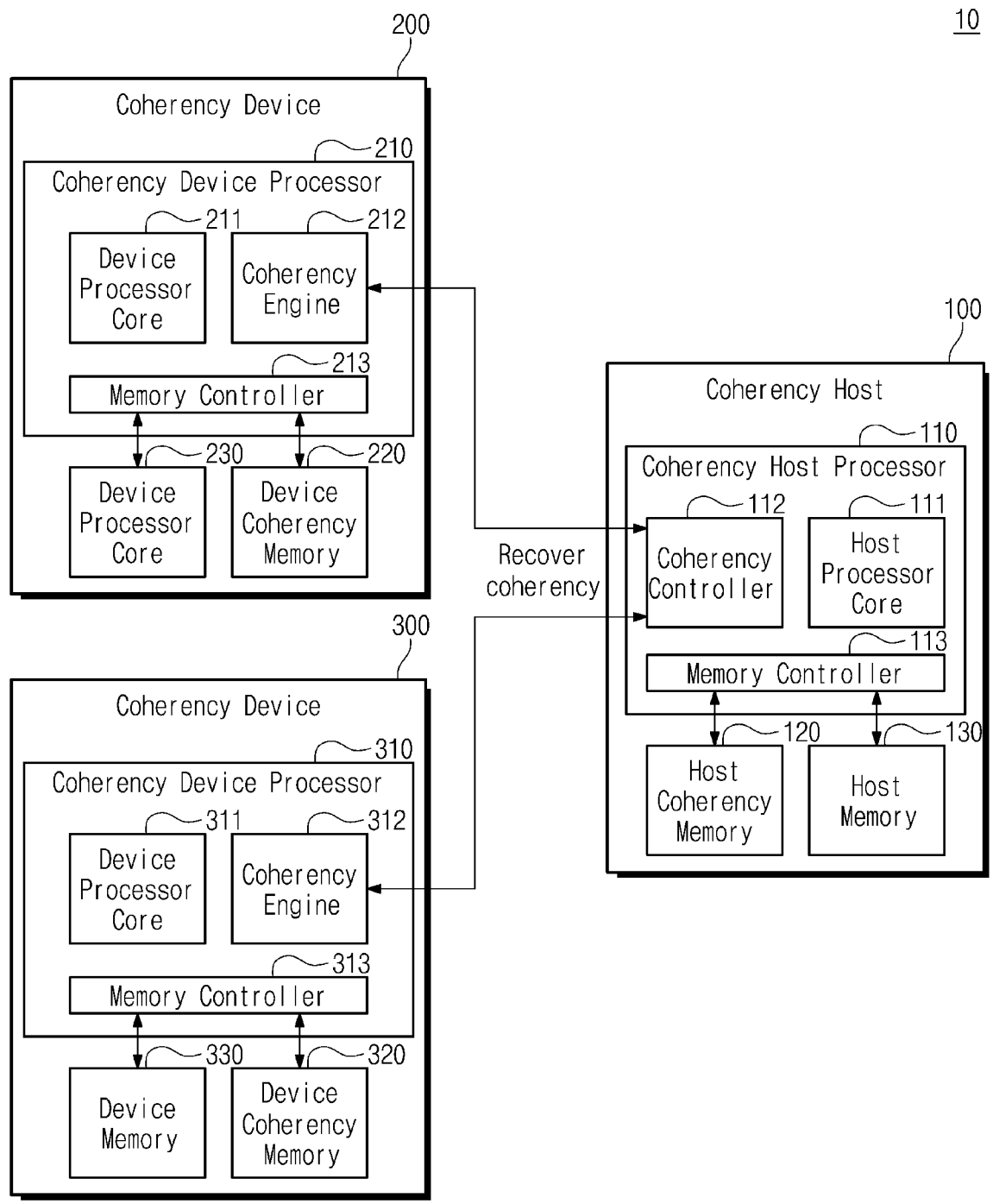
FIG. 8 illustrates an example corresponding to the case where an electronic device completes processing in a first bias mode and enters a second bias mode according to an embodiment of the present disclosure.

FIG. 8 illustrates an example corresponding to the case where the electronic device 10 completes processing in the first bias mode and enters the second bias mode. Referring to FIG. 8, the device coherency memory 220 of the first coherency device 200 may store output data corresponding to a processing result of the device processor core 211. The device coherency memory 320 of the second coherency device 300 may store output data corresponding to processing result of the device processor core 311.

As the electronic device 10 enters the second bias mode, the cache coherency of the coherency host 100, the first coherency device 200, and the second coherency device 300 may be recovered. Data modified by the processing of the first coherency device 200 may be shared by the coherency host 100 and/or the second coherency device 300. Data modified by the processing of the second coherency device 300 may be shared by the coherency host 100 and/or the first coherency device 200.

As described above, the electronic device 10 according to an embodiment of the present disclosure blocks the cache coherency while the first coherency device 200 and/or the second coherency device 300 performs an operation. When the operation of the first coherency device 200 and/or the second coherency device 300 is completed, the cache coherency is recovered. In other words, the cache coherency may be delayed until the operation of the first coherency device 200 and/or the second coherency device 300 is completed.

While the cache coherency is delayed, the first coherency device 200 and/or the second coherency device 300 may access the device coherency memory 220 and/or the device coherency memory 320 in a fast, safe manner and may perform an operation. When the cache coherency is recovered, only data modified by the first coherency device 200 and/or the second coherency device 300 may be shared, and thus, a tune and resource necessary to recover the cache coherency may decrease.

In particular, in the case of a database server, most processing is performed on previously stored data, and a result of the processing causes the update of the previously stored data. The methods according to an embodiment of the present disclosure, which support fast and safe operations by synchronizing input data and output data through the cache coherency before and after the operations and delaying the cache coherency during the operations, may show optimum performance in an environment such as the database server.

Figure 9:
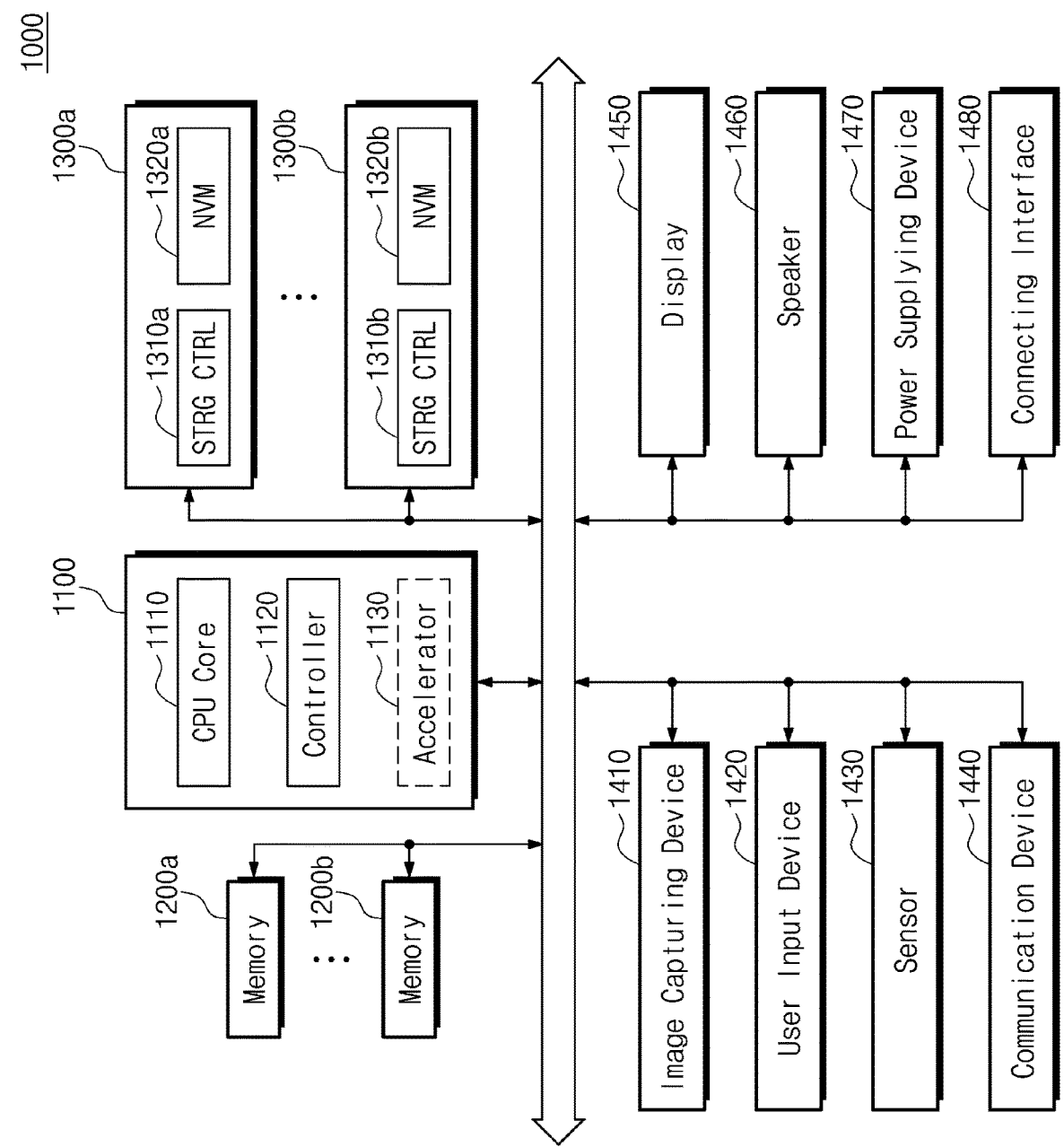
FIG. 9 is a diagram illustrating a system according to an embodiment of the present disclosure.

FIG. 9 is a diagram of a system 1000 to which a storage device is applied, according to an embodiment of the present disclosure. The system 1000 of FIG. 9 may be a mobile system, such as a portable communication terminal (e.g., a mobile phone), a smartphone, a tablet personal computer (PC), a wearable device, a healthcare device, or an Internet of things (IOT) device. However, the system 1000 of FIG. 9 is not necessarily limited to the mobile system and may be a PC, a laptop computer, a server, a media player, or an automotive device (e.g., a navigation device).

Referring to FIG. 9, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments of the present disclosure, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have a larger storage capacity than the memories 1200a and 1200b. The storage devices 1300a and 1300b may respectively include storage controllers (STRG CTRL) 1310a and 1310b and Non-Volatile Memorys (NVMs) 1320a and 1320b configured to store data under the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In an embodiment of the present disclosure, the coherency host 100 described with reference to FIGS. 1 to 8 may be implemented to correspond to the CPU core 1110. The first coherency device 200 and/or the second coherency device 300 described with reference to FIGS. 1 to 8 may be implemented to correspond to the accelerator 1130. As another example, the coherency host 100 described with reference to FIGS. 1 to 8 may be implemented to correspond to the main processor 1100. The first coherency device 200 and/or the second coherency device 300 described with reference to FIGS. 1 to 8 may be implemented with a separate sub-processor (e.g., an accelerator processor) assisting the main processor 1100.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit (IC), an application specific IC (ASIC), a field programmable gate array (FPGA), and a complex programmable logic device (CPLD), firmware driven in hardware devices, software such as an application, or a combination of a hardware device and software. In addition, the blocks may include circuits implemented with semiconductor elements in an integrated circuit, or circuits enrolled as an intellectual property (IP).

According to the present disclosure, an electronic device may block the cache coherency while performing an independent operation. Accordingly, the independent operation may be performed quickly and safely. In addition, as data modified before and after the independent operation are shared, the cache coherency is secured before and after the independent operation.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operating method of an electronic device which includes a processor and a memory, the method comprising:
    accessing, using the processor, the memory without control of an external host device in a first bias mode;
    sending, from the processor, information of the memory to the external host device when the first bias mode ends;
    switching to a second bias mode from the first bias mode, wherein switching to the second bias mode from the first bias mode includes invalidating cache lines including data modified in the first bias mode and, after invalidating the cache lines, the external host device requests modified data from the processor, and the processor provides the requested data to the external host device using cache miss handling;
    accessing, using the processor, the memory under control of the external host device in the second bias mode; and
    accessing, using another processor, another memory under control of the external host device, while the memory is accessed in the first bias mode without control of the external host device.

2. The method of claim 1, further comprising:
    entering the first bias mode from the second bias mode, wherein the entering of the first bias mode from the second bias mode includes:
    receiving, at the processor, data from the external host device; and
    updating, using the processor, the memory with the received data.

3. The method of claim 2, wherein the entering of the first bias mode from the second bias mode further includes:
    sending, from the processor, the received data to the external host device; and
    entering the first bias mode in response to an acknowledgement message received from the external host device.

4. The method of claim 2, wherein the received data correspond to at least one cache line.

5. The method of claim 1, further comprising:
accessing, using the processor, the memory without control of the external host device in a third bias mode.

6. The method of claim 5, wherein the second bias mode is a host bias mode of the Compute Express Link standard, and the third bias mode is a device bias mode of the Compute Express Link standard.

7. An operating method of an electronic device which includes a processor and a memory, the method comprising:
not intervening, with the processor, in an access of an external electronic device to a memory of the external electronic device, in a first bias mode;
receiving, at the processor, information of the memory of the external electronic device from the external electronic device when the first bias mode ends;
switching to a second bias mode from the first bias mode, wherein switching to the second bias mode from the first bias mode includes invalidating cache lines including data modified in the first bias mode and, after invalidating the cache lines, the external electronic device requests modified data from the processor, and the processor provides the requested data to the external electronic device using cache miss handling;
controlling, using the processor, the access of the external electronic device to the memory of the external electronic device, in the second bias mode; and
controlling, using another processor, the access of the external electronic device to another memory of the electronic device, while not intervening, with the processor, in the access of the external electronic device to the memory of the external electronic device, in the first bias mode.

8. The method of claim 7, further comprising:
entering the first bias mode from the second bias mode, wherein the entering of the first bias mode from the second bias mode includes:
detecting, using the processor, data modified in association with the external electronic device from among data of the memory; and
sending, from the processor, the modified data to the external electronic device.

9. The method of claim 8, wherein the entering of the first bias mode from the second bias mode further includes:
receiving, at the processor, data from the external electronic device; and
sending, from the processor, an acknowledgement message to the external electronic device in response to the modified data and the received data being matched.

10. The method of claim 7, further comprising:
maintaining, using the processor, data of a storage space allocated to the memory in association with the memory of the external electronic device, in the first bias mode.

11. The method of claim 7, further comprising:
receiving, at the processor, data corresponding to the information of the memory of the external electronic device from the external electronic device when the first bias mode ends; and replacing, using the processor, data of the memory with the received data based on the information of the memory of the external electronic device.

12. An operating method of an electronic device which includes a host device and an accelerator, the method comprising:
maintaining, using the host device, a coherency of a memory of the accelerator and a memory of the host device while the accelerator does not perform an operation;
blocking, using the host device, the coherency of the memory of the accelerator and the memory of the host device while the accelerator performs an operation;
recovering, using the host device, the coherency of the memory of the accelerator and the memory of the host device after the accelerator completes the operation, wherein the recovering of the coherency of the memory of the accelerator and the memory of the host device includes invalidating cache lines including modified data of data included in the memory of the accelerator and providing the modified data to the host device using cache miss handling; and
maintaining, using the host device, the coherency of another memory of another accelerator while the coherency of the memory of the accelerator and the memory of the host device is blocked while the accelerator performs the operation.

13. The method of claim 12, wherein the blocking of the coherency of the memory of the accelerator and the memory of the host device includes:
sending, from the host device, the modified data to the accelerator; and
replacing, using the accelerator, the data of the memory of the accelerator with the modified data.

14. The method of claim 12, wherein the recovering of the coherency of the memory of the accelerator and the memory of the host device includes:
sending, from the accelerator, information of the cache lines of the modified data to the host device;
invalidating, using the host device, data corresponding to the information of the cache lines of the modified data in the memory of the host device; and
in response to a request for the modified data, reading, using the host device, the modified data from the accelerator to update the data of the memory of the host device.

15. The method of claim 12, wherein the recovering of the coherency of the memory of the accelerator and the memory of the host device includes:
sending, from the accelerator, information of the cache lines of the modified data to the host device;
sending, from the accelerator, the modified data to the host device; and
replacing, using the host device, data of the memory of the host device with the modified data based on the information of the cache lines of the modified data.

* * * * *